L. LANDEKER & H. S. LAIRD.
Nut-Lock.

No. 199,834.              Patented Jan. 29, 1878.

Witnesses
Jno. L. Boone
Frank A. Brooks

Inventor
Lazare Landeker
Hiram S. Laird
by Dewey & Co.
Attys.

N. PETERS, PHOTO-LITHOGRAPHER, WASHINGTON, D. C.

UNITED STATES PATENT OFFICE.

LAZARE LANDEKER AND HILAMON S. LAIRD, OF SAN LUIS OBISPO, CAL.

IMPROVEMENT IN NUT-LOCKS.

Specification forming part of Letters Patent No. 199,834, dated January 29, 1878; application filed November 6, 1877.

*To all whom it may concern:*

Be it known that we, LAZARE LANDEKER and HILAMON SPENCER LAIRD, of the city and county of San Luis Obispo and State of California, have invented an Improved Nut-Lock; and we do hereby declare the following to be a full, clear, and exact description thereof, reference being had to the accompanying drawings.

The object of our invention is to provide a cheap, simple, and effective device for securing nuts to bolts, which are liable to become loose by constant jarring or from other causes; and it consists of a metallic washer having projecting flanges on its upper side, which prevent the nut from turning on the washer, and having one or more pawls or catches, which engage with radial slots or grooves in a second washer, placed below the first, or in the surface which the first or upper washer is in contact with, so that as the nut is turned on the bolt the first washer turns with it, and engages with the slots or grooves, so as to prevent the nut from turning back, but permitting it to be turned forward or tightened whenever it becomes loose.

In case a second washer is used we provide it with flanges, which enter the bolt-hole, and thus prevent it from turning on the bolt.

Figure 1:
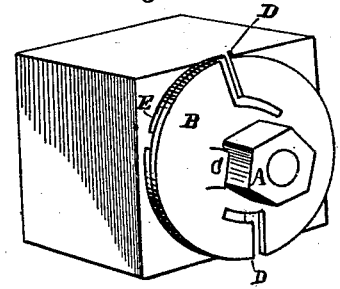
Figure 2:
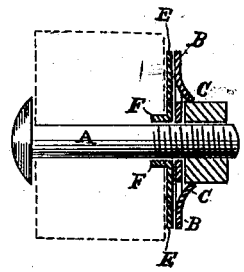
Figure 3:
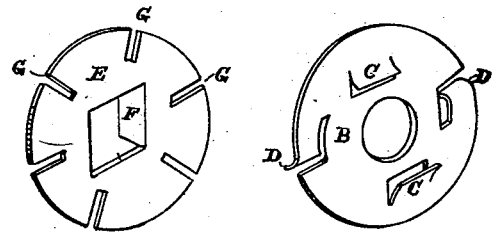
Figure 4:
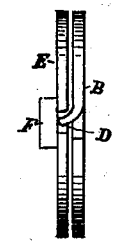

Referring to the accompanying drawings, Figure 1 is a perspective view; Fig. 2, a vertical section. Figs. 3 and 4 are detail views.

Let A represent an ordinary bolt, with nut of any shape. We place a washer, B, made of suitable sheet metal, on the bolt directly below the nut. Two of the edges, on opposite sides of the opening in which the bolt is placed, we turn up, so as to form flanges C on its upper side, between which the nut will be held. On the under side of the washer, and near its outer edge, we form one or more downward-projecting pawls or catches, D, by slitting the edge of the plate radially and bending one edge of the slit downward.

Below the first washer we place a second washer, E, which we prevent from turning on the bolt by a flange, F, formed on either side of the bolt-hole in the washer, and which enters the hole in the material through which the bolt passes. In this washer E we make any suitable number of radial slots, G G, corresponding with the pawls or catches on the upper washer. This second washer E can be dispensed with in some cases, and similar radial slots or grooves formed in the surface with which the first washer B comes in contact.

The operation of our nut-lock is as follows: The bolt being in place, the washer E is placed on the bolt, with its flanges F in the bolt-hole on either side of the bolt. The washer B is then placed on the bolt below the nut, the nut resting between the flanges C on the washer, so that as the nut is turned on the bolt the upper washer will turn with it. When the nut and washer B reach the stationary washer E, the pawl D will engage with the slots in the washer E, so as to prevent the washer B or the nut from being turned back; but they both can be turned forward until the nut is tight on the bolt.

When it is desired to remove the nut the flanges C can be driven below the nut by a punch or cold-chisel, when the nut will be free from the washer, and can be removed in the ordinary manner; and the flanges, after being pounded down to remove the nut, can be knocked back again, and the washer be used as before.

By our invention we are enabled to tighten the nut at any time when it may become loose on the bolt, while at the same time it cannot be loosened without pounding down the flanges C, as heretofore described.

This form of nut-lock can be very cheaply and easily made, the washers being made of sheet metal. One operation of the punch forms the flanges, bolt-hole, pawls, and washer complete.

This form of nut-lock can be used with advantage in the construction of machinery, in the fastening of rail-joints, and in any case where a nut-lock is desired.

Having thus described our invention, what we claim, and desire to secure by Letters Patent, is—

1. A nut-lock consisting of a washer, B, having upwardly-projecting flanges C and pawls D, in combination with a washer, E, having downwardly-projecting flanges F and radial slots G G, constructed, combined, and arranged substantially as and for the purpose herein described.

2. The washer B, with its upwardly-projecting flanges C and inwardly-projecting pawls D, in combination with the radial grooves or slots H H in the surface of the material which the washer is in contact with, and a bolt and nut, substantially as and for the purpose herein shown and described.

In witness whereof we have hereunto set our hands and seals.

LAZARE LANDEKER. [L. S.]
HILAMON SPENCER LAIRD. [L. S.]

Witnesses:
R. M. PRESTON,
JOSEPH KAISER.